United States Patent
Barbado Montero (10) Patent No.: US 10,219,442 B2
(45) Date of Patent: Mar. 5, 2019

(54) DEVICE FOR INJECTING AT LEAST ONE CHEMICAL SUBSTANCE AND/OR PREPARATION INTO TREES AND/OR PALMACEAE AND APPLICATION METHOD THEREOF

(75) Inventor: Juan Jesus Barbado Montero, Cordoba (ES)

(73) Assignee: FERTINYECT, S.L., Cordoba (ES)

( * ) Notice: Subject to any disclaimer, the term of this patent is extended or adjusted under 35 U.S.C. 154(b) by 0 days.

(21) Appl. No.: 13/540,644

(22) Filed: Jul. 3, 2012

(65) Prior Publication Data

US 2012/0266534 A1    Oct. 25, 2012

Related U.S. Application Data

(63) Continuation of application No. PCT/ES2010/070530, filed on Jul. 30, 2010.

(30) Foreign Application Priority Data

Mar. 26, 2010 (ES) .................................. 201030458

(51) Int. Cl.
*A01G 7/06*        (2006.01)
(52) U.S. Cl.
CPC ...................................... *A01G 7/06* (2013.01)
(58) Field of Classification Search
CPC .......... A01G 7/06; B27K 3/105; B27K 3/086; B27K 3/06; A01M 21/04; A01M 21/043
USPC .......... 47/57.5; 222/212, 206–209, 214, 490, 222/498; 239/569–583
See application file for complete search history.

(56) References Cited

U.S. PATENT DOCUMENTS 1,718,195 A * 6/1929 Rankin .......................... 47/57.5
2,321,836 A * 6/1943 Marzor .................. B65D 25/16
                                              220/495.03
3,130,519 A    4/1964 Mauget
(Continued)

FOREIGN PATENT DOCUMENTS

CN          1491200 A       4/2004
CN          2872829 Y       2/2007
(Continued)

OTHER PUBLICATIONS

Machine translation for KR100849863.*
(Continued)

*Primary Examiner* — Son T Nguyen
(74) *Attorney, Agent, or Firm* — Hayes Soloway PC (57) ABSTRACT

The present invention relates to a device for injecting at least one chemical substance and/or preparation into trees and/or palmaceae, that includes:
a) a vessel with an elastic container located inside said vessel, the elastic container containing the chemical substance and/or preparation at a pressure between 1 and 1.8 bars;
b) a connecting element adapted to be introduced into the tree or palmaceae trunk by at least one of its ends; and
c) an adapter system located at the outlet of the vessel, which comprises a non-return membrane, a membrane-carrier element, and a closing element of said adapter system, the adapter system allowing single or multiple dosages of the elastic container with chemical substances and/or preparations through the non-return membrane, and the coupling to the connecting element by a second end thereof.

13 Claims, 7 Drawing Sheets

(56) References Cited

U.S. PATENT DOCUMENTS

| | | | |
|---|---|---|---|
| 3,211,184 A * | 10/1965 | Greer | F15B 1/165 |
| | | | 138/30 |
| 3,791,557 A * | 2/1974 | Venus, Jr. | 222/105 |
| 3,796,356 A * | 3/1974 | Venus, Jr. | 222/212 |
| 3,992,813 A | 11/1976 | Freshel | |
| 4,103,456 A * | 8/1978 | Hendrixson et al. | 47/57.5 |
| 5,031,357 A * | 7/1991 | Macbeth | 47/57.5 |
| 5,273,786 A * | 12/1993 | Brown | B27K 3/0235 |
| | | | 222/386.5 |
| 5,355,619 A | 10/1994 | West et al. | |
| 6,216,388 B1 | 4/2001 | Miller et al. | |
| 6,336,571 B1 * | 1/2002 | Chibret et al. | 222/189.09 |
| 6,672,479 B2 * | 1/2004 | Shiraishi | B65D 23/02 |
| | | | 222/105 |
| 2001/0056259 A1 * | 12/2001 | Skinkle | A61M 5/1454 |
| | | | 604/151 |
| 2003/0196374 A1 | 10/2003 | Wells | |
| 2005/0223637 A1 * | 10/2005 | Black et al. | 47/57.5 |
| 2007/0266628 A1 | 11/2007 | Doolittle | |

FOREIGN PATENT DOCUMENTS

| | | |
|---|---|---|
| DE | 3504323 A1 | 4/1986 |
| DE | 3504323 A1 * | 8/1986 |
| EP | 0947208 A2 | 10/1999 |
| GB | 1179151 | 1/1970 |
| JP | S62-282524 A | 12/1987 |
| JP | H11-285530 A | 10/1999 |
| JP | 2000189034 A | 7/2000 |
| JP | 2000125664 A | 5/2005 |
| KR | 100849863 B1 | 8/2008 |
| WO | 2002037948 A1 | 5/2002 |

OTHER PUBLICATIONS

International Search Report dated Dec. 28, 2010 in International (PCT) Application No. PCT/ES2010/070530.
Navarro, et al., "A Low-pressure, Trunk-injection Method for Introducing Chemical Formulations into Olive Trees" J. Amer. Soc. Hort. Sci. 117 (2):357-360. 1992.
Sanchez-Zamora, et al., "Uptake and Distribution of Trunk Injections in Conifers" Journal of Arboriculture 30(2): Mar. 2004.
Sanchez-Zamora, et al., "Injector-size and the time of application affects uptake of tree trunk-injected solutions" Scientia Horticulturae 84 (2000) 163-177.
Cordova, et al., "Control of cochineal of the oak (*Asterolecanium ilicicola*, Targioni, 1892) by injecting insecticides the tree trunk" Bol. San. Veg. Pests, 23: 607-612, 1997.
The Rural and Regional Planning Memorandum, Subject: Implementation of the experimental device for injection into the framework of the fight Mandatory against the red palm weevil, General Directorate for Food Health Risk Prevention Department of the primary production Sub-Directorate for Quality and Plant Protection Bureau of seed and plant protection, Date: Mar. 21, 2012.
Tree Care and ornamental shrubs, Nursery crops, solid and recreational areas alignments, Bayer Environmental Science, A Business Operation of BayerCropScience brochure.
Environmental Science—France, Green Spaces, Confidor Training Green—Ynject, Apr. 2012.

* cited by examiner

DEVICE FOR INJECTING AT LEAST ONE CHEMICAL SUBSTANCE AND/OR PREPARATION INTO TREES AND/OR PALMACEAE AND APPLICATION METHOD THEREOF

This application is a Continuation of international application PCT/ES2010/070530, filed Jul. 30, 2010, which is hereby incorporated by reference in its entirety.

TECHNICAL FIELD OF THE INVENTION

The present invention relates to the field of treating trees and palmaceae. Namely, it relates to a new device for direct injection at least one chemical substance and/or preparation into trees and/or palmaceae vascular system, as well as the application method of said device.

BACKGROUND OF THE INVENTION

Much progress has been made, in recent years, in methods for treating trees and palmaceae. In the specific case of phytosanitary treatments, the endotherapy or systemic injection mainly based on the direct injection of phytosanitary product into trees and palmaceae vascular system should be mentioned among the different methods developed as alternatives to conventional foliar and soil application methods of chemical products. Its main advantage, in comparison with other conventional methods, is its great simplicity and ease of use, as well as its low environmental impact.

Primarily, four main injection systems are distinguished: macroinjections, implants, microinjections, and low-pressure injections. Among them, the present invention is contained within endotherapy treatments by low-pressure injection that have, in addition, to the benefits inherent to endotherapy, the additional advantage of not damaging the vascular system of the species to be treated by using the natural transpiration process thereof for absorbing the injected products.

In patent literature it is possible to find examples of injectors developed for applying phytosanitary products into trees. Thus, for example, application CN 101491200 is directed towards a tree trunk liquid injector capable of preventing chemical damages derived from its application.

In turn, WO/2002/037948 describes a device for arboreal plant endotherapy characterized in that it comprises a dose control system of the product applied to the plant.

It is therefore object of this invention to present an improved alternative with respect to the existing systems for injecting chemical substances and/or preparations into trees and palmaceae, with the special feature of allowing single or multiple dosages, and dosing the products to be used in the treating method at source (packing factory) or in situ (before its application in destination). This is also a very simple and completely safe method for both environment and people.

Furthermore, the application method of said device is an object of this invention.

DESCRIPTION OF THE INVENTION

The present invention addresses a new device for injecting at least one chemical substance and/or preparation into trees and/or palmaceae, characterized in that it comprises:
a) a vessel comprising inside an elastic container suitable for containing the chemical substance and/or preparation at low pressure; meaning a pressure between about 1 and 1.8 bars;
b) a connecting element adapted to be inserted by at least one of its ends into the tree or palmaceae trunk;
c) a non-return adapter system located at the vessel outlet. This adapter system preferably made of a polymeric plastic material (polyethylene, polypropylene, etc.) is in turn characterized in that it comprises a membrane-carrier element, a non-return valve or membrane, and an adapter system closing element.

Preferably, the vessel comprises a main cylindrical body having a neck at its upper end adaptable to the non-return adapter system. Likewise, said vessel can be made of different materials, a polymeric plastic material being preferred. In a preferred embodiment of the invention, the vessel used can be disposable (or of the "use and throw away" type). A new vessel can be used for each application.

In turn, the connecting element can be made, as in the case of the non-return adapter system, of a polymeric plastic material (polyethylene, polypropylene, etc.) and it is characterized in that it comprises an end especially suitable for being inserted into the tree or palmaceae trunk to be treated, as well as for allowing the chemical product to flow through therein. It further comprises a second end, preferably tube-shaped, suitable for being connected to the elastic container containing the chemical substance and/or preparation to be injected through the non-return valve or membrane of the adapter system.

As previously mentioned, said non-return adapter system is characterized in that it comprises a membrane-carrier element, a non-return valve or membrane and an adapter system closing element, and it is especially designed to be perfectly adapted to the vessel neck.

First of all, the membrane-carrier element has a first open end adapted to be connected to the elastic container located inside the vessel and containing the chemical substance and/or preparation to be injected, as well as an end opposite to the previous one designed for supporting the non-return valve or membrane of the adapter system and to be coupled to the closing element thereof.

Said non-return valve or membrane is characterized in that it is suited to be connected to the connecting element, as well as to any other dosing or filling device that may be used in order to insert the chemical substance and/or preparation to be injected. At the same time, it allows the prevention of unwanted losses of the chemical substance and/or preparation to the exterior.

In a preferred embodiment of the invention, said non-return valve or membrane can consist of a non-return membrane made of a polymeric material, preferably, a synthetic or natural elastomer, and more preferably nitrile rubber (NBR).

Finally, the non-return adapter system can comprise a closing element, preferably made of a polymeric plastic material, designed to be coupled to the membrane-carrier element, and to fasten the non-return valve or membrane located between both elements (the membrane-carrier element and the closing element).

In a particular embodiment of the invention, both the connecting element and the non-return adapter system can be made of a reusable material, allowing their use in more than one application.

Additionally, an object of this invention is a method for applying at least one chemical substance and/or preparation to at least one tree and/or palmaceae characterized in that it comprises:
a) making at least one hole in the tree and/or palmaceae trunk;

b) inserting a connecting element, by a first end thereof, into the hole(s) made in the previous step;
c) connecting said connecting element, by a second end thereof, to a vessel characterized in that it comprises an elastic container containing the chemical substance and/or preparation, wherein said connection is carried out by means of the non-return adapter system.

Therefore, the method starts by making at least one hole in the trunk of the arboreal species to be treated. Therefore, it is possible to use any device suitable for this purpose, the use of drills and metal drill bits being especially preferred.

Then, in order to facilitate the insertion of the connecting element into the hole(s) made in the tree or palmaceae trunk the use of a hammer may be helpful, preferably, with rubber or nylon head.

One of the advantages of the present invention is the possibility of adapting it to the environment or species to be treated, allowing the device to be applied in any direction (upward, downward, or even sideways).

It should be noted that the prior method is not limited to a certain type of tree or palmaceae, even though it is especially suited for treating trees with a 5 cm trunk diameter and palmaceae with a stipe diameter of at least 30 cm.

In the same way, neither the chemical substance nor the preparation to be injected is a limitative characteristic of the invention, Phytosanitary active substances, pest-control substances (insecticide, fungicide, herbicide), fertilizers or phyto-fortifiers, as well as any combination thereof, among others, can be used.

On the other hand, one of the advantages of the application method of the present invention is its great flexibility, by allowing dosing the chemical substance and/or preparation to be injected both at source (in factory) as well as in destination (in application). In this way it is possible to simply carry out the dosage in destination, and with the proper pressure through the non-return valve or membrane of the adapter system.

A further advantage of the method of the invention is the possibility of carrying out a multiple load of the elastic container of the application device. In this way it is possible, for example, to preload it at source (factory) with certain base solution as, for example, an aqueous solution that can comprise at least one substance selected among nutritious substances, fertilizers, phyto-fortifiers, etc., as well as any combination thereof and, subsequently, dosing in destination the substances and/or preparations to be injected, preferably selected among fertilizers, phyto-fortifiers, and phytosanitary preparations, or any combination thereof. Therefore the described method allows multiple treatments to be carried out in a single application.

The chemical substance and/or preparation dosing or filling (both at source as well as in destination) can be carried out by using any device suitable for this purpose. In particular, conventional syringes, dosing guns, etc. can be used, as long as these are provided with a dosing nozzle suitable for carrying out the insertion of the chemical substance and/or preparation in the elastic container of the device through the non-return adapter system.

Preferably, the pressure inside the elastic container is between 1 and 1.8 bars.

Once the elastic container contains the chemical substance and/or preparation to be injected, it is connected to the connecting element by the non-return adapter system, leading to the absorption of the chemical substance and/or preparation into the tree and/or palmaceae, which are then transported and distributed to different tree and/or palmaceae tissues through their vascular system using a natural transpiration process. In this sense in a preferred embodiment wherein the vessel used is made of a flexible material, preferably, a low-density polymeric plastic material, it is possible to know the moment in that the chemical substance and/or preparation have been completely absorbed by causing the vessel deformation as the elastic container inside the vessel and packing, preferably, under vacuum, is gradually emptying.

The required time for completely absorbing the chemical substance and/or preparation depends on the tree or palmaceae to be treated, ranging from 5 to 60 minutes, mainly depending on the tree or palmaceae xylem porosity and other factors, for example, room temperature (namely, the higher the temperature, the higher the tree transpiration rate will be).

Finally, once the chemical substance and/or preparation has been absorbed, it is possible to remove the empty vessel from the device and connecting element, which can be reused in new applications.

As previously mentioned, the described method is very versatile, allowing the device to be mounted and loaded with the chemical substance and/or preparation to be injected at source (factory), as well as, alternatively, mounting the device preloaded with a base substance, and dosing the active substance and/or preparation to be injected in destination (in situ). Likewise, there is also the alternative of mounting the device at source and loading it in destination with the final mixture to be injected.

Therefore, the main advantages provided by the present invention in comparison with other devices and methods of the state of the art for applying products to trees and palmaceae are the following:

a) Firstly, this technique is fully respectful of the tree or palmaceae vascular system by allowing insertion of the chemical substance and/or preparation thereto by a natural transpiration process from the content of the elastic container located inside the vessel of the application device. In turn, it allows the proper pressure for introducing the chemical substance and/or preparation into the vascular current of tree or palmaceae to be treated to be established. Thus possible overpressure damages are prevented;

b) Likewise, it allows carrying out a dosage of the mixture volume injected into each point or hole made in the tree or palmaceae. Thus it offers the possibility of injecting the chemical substance and/or preparation at low concentrations, therefore preventing unwanted variations of the tree or palmaceae pH, as well as possible damages caused to vascular tissues in the penetration area.

c) On the other hand, it allows a more homogeneous distribution of the chemical substance and/or preparation to be carried out, by injecting the required doses into each one of the injection points. It offers the possibility of pre-setting the proper dose to be injected into each point or hole, thus avoiding the risks of other injection systems wherein the product is distributed from a single reservoir or tank to different intercommunicated injection points;

d) It is also characterized by its great simplicity. Therefore, because it is based on the use of expendable or reusable elements—which number will depend on the amount of trees or palmaceae to be treated—it provides the advantage of not requiring any kind of investment in machinery or maintenance, and therefore reduces costs. On the other hand, as a consequence of its great simplicity, its application field may cover not only professional use, but also the domestic one because its use does not require special skills. Thus, it is a universal device, available in any location of the species to be treated;

e) Additionally, both the connecting element and its application method provide the advantage of being inviolable by using the non-return valve or membrane which allows introducing the chemical substance and/or preparation to be injected, preventing at the same time its leakage to the exterior. This fact it makes possible the use of the device in environments where a greater danger to people exists as, for example, urban environments, thus avoiding potential risks to health or the environment in case of possible episodes of vandalism, children carelessness or domestic or wild animals interventions, among other examples;

f) On the other hand, it is adapted to the new requirements and standard policies in Europe and worldwide. More specifically, in the case of the European Union, it agrees with the Directive on Sustainable Use of Pesticides, which allows only the use of application techniques of phytosanitary products:
without risk to human health:
in the case of the device, either for professional or domestic use, there is no risk in its handling and application, during both placing and removing the device after the absorption, since there is not a direct contact between the user and the substances or preparations to be injected;
also, because it is a completely hermetic device there is no risk to people who may be affected by the presence of chemical product in the environment, or by the accidental handling of the system. This characteristic is especially relevant in urban environments wherein a higher risk for people exists and wherein the referred Directive forbids most part of the conventional application methods as for example foliar spraying; and
without risk of environmental contamination since, in addition to the advantages already provided by the trunk injection application system itself, the use of this device generates no residues to the environment due to the direct insertion of the chemical substance and/or preparation into the plant vascular system. Similarly, there is no possibility of chemical substance and/or preparation spillage or direct manipulation, and it avoids generating washing waters by comprising an expendable and inviolable vessel, as well as a connecting element and an adapter system, both expendable.

g) In turn, it prevents possible risks of transmitting diseases between trees or palmaceae to be treated during the work of application, by allowing the use of an independent connecting element for each hole;

h) This is also a very versatile method, both technically and economically feasible in all fields wherein there are trees, both agriculture and forestry, and especially, in green areas;

i) Additionally, it provides a higher application yield and, therefore a lower workforce cost in comparison with other injection systems since waiting for the product to be absorbed by the tree or palmaceae is not required as it occurs in the existing forced-injection systems. This in turn allows its application to a higher number of trees or palmaceae per working day;

j) On the other hand, in comparison with other devices wherein the storing time of the vessels has to be very short because of the presence of phytosanitary products at source, by using this device it is possible to increase the durability and easiness in managing its storage by allowing the chemical products to be dosed in destination, just before being applied.

k) Also, the possibility of loading the chemical products in destination eases their commercial distribution, since it allows them to be more easily adapted to the standards of the destination countries or areas;

l) Lastly, this is a system compatible with any pest-control substance registered and authorized in any country of the world.

BRIEF DESCRIPTION OF THE FIGURES

Accompanying this description, a set of figures is included, wherein the preferred embodiments of the invention have been illustrated, by way of example and not in a limitative manner. In this way.

DETAILED DESCRIPTION OF THE INVENTION

In view of the figures, in an especially preferred embodiment of the invention the application device is characterized in that it comprises a vessel (1) comprising inside an elastic container (2) intended for containing the chemical substance and/or preparation.

Figure 1:
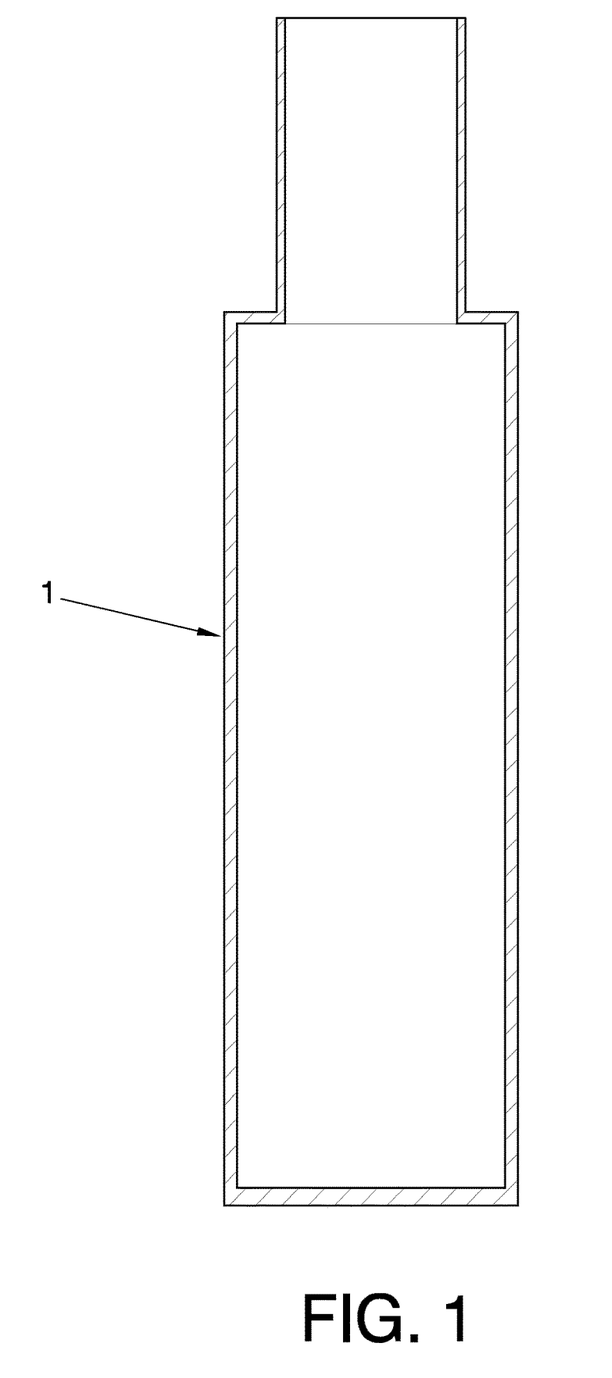
FIG. 1 shows a view corresponding to the vessel intended for containing the elastic container accommodating the chemical substance and/or preparation to be applied.

FIG. 1 represents a vessel (1) comprising a main body, preferably of 218.4 mm in length, and a neck preferably with a length of 30 mm. Preferably, the inner diameter of the neck is 23 mm and the inner diameter of the main body is 50 mm.

Figure 2:
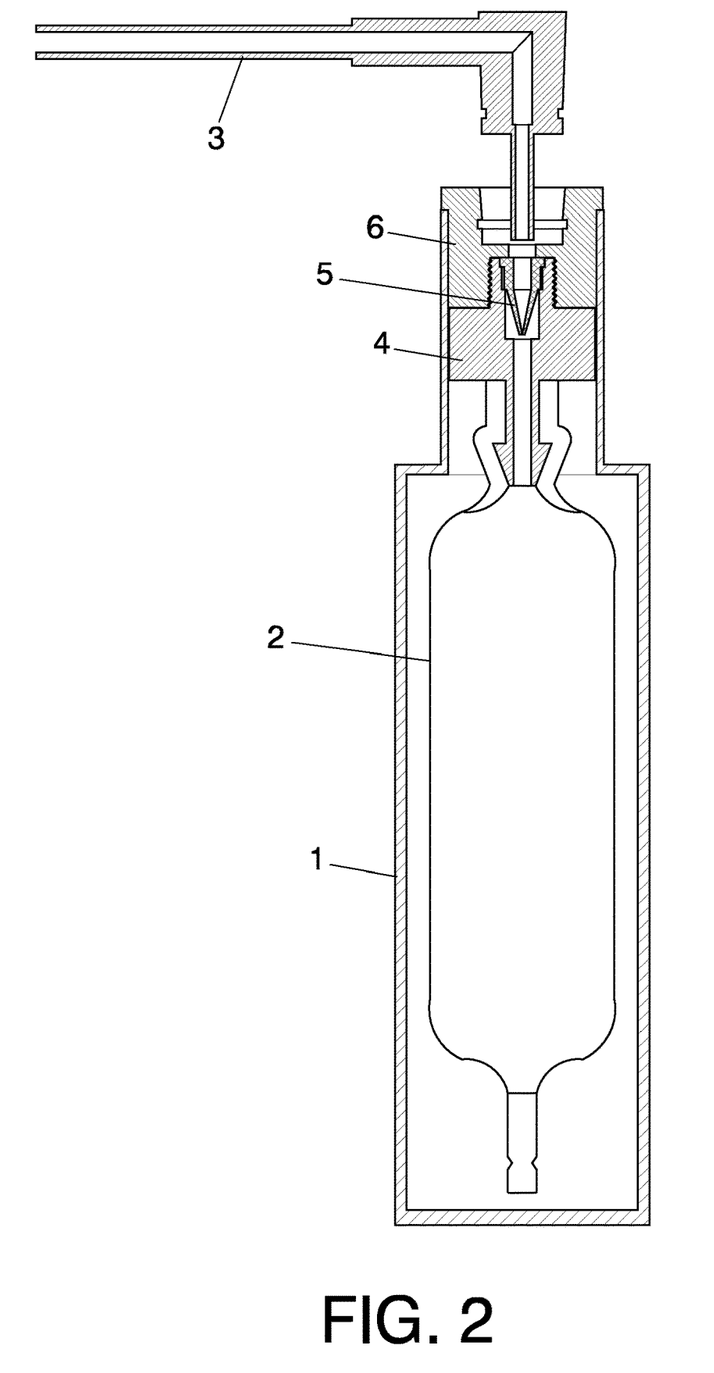
FIG. 2 shows a view corresponding to the connecting element assembly; the non-return adapter system of the membrane-carrier, non-return membrane and adapter system closing element and the vessel containing the elastic container.
Figure 3:
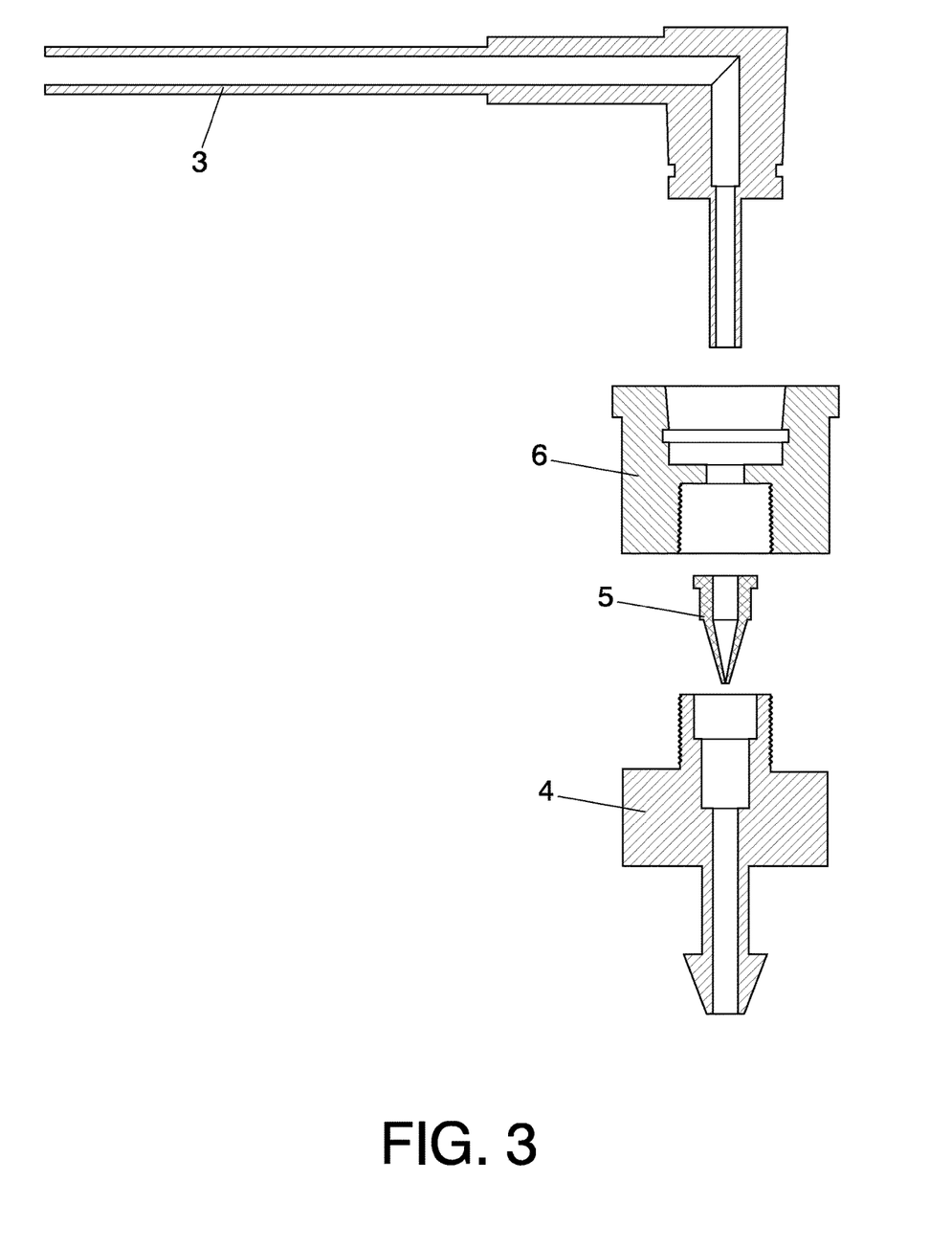
FIG. 3 shows a view of the connecting element assembly; the non-return adapter system of the membrane-carrier, non-return membrane and adapter system closing element.

FIG. 2 shows a view corresponding to the connecting element (3) assembly; the non-return adapter system of the membrane-carrier (4), non-return membrane (5) and adapter system closing element (6) and the vessel (1) containing the elastic container (2);

FIG. 3 shows in detail the connecting element (3) assembly and the non-return adapter system of the membrane-carrier (4), non-return membrane (5) and adapter system closing element (6).

Figure 4:
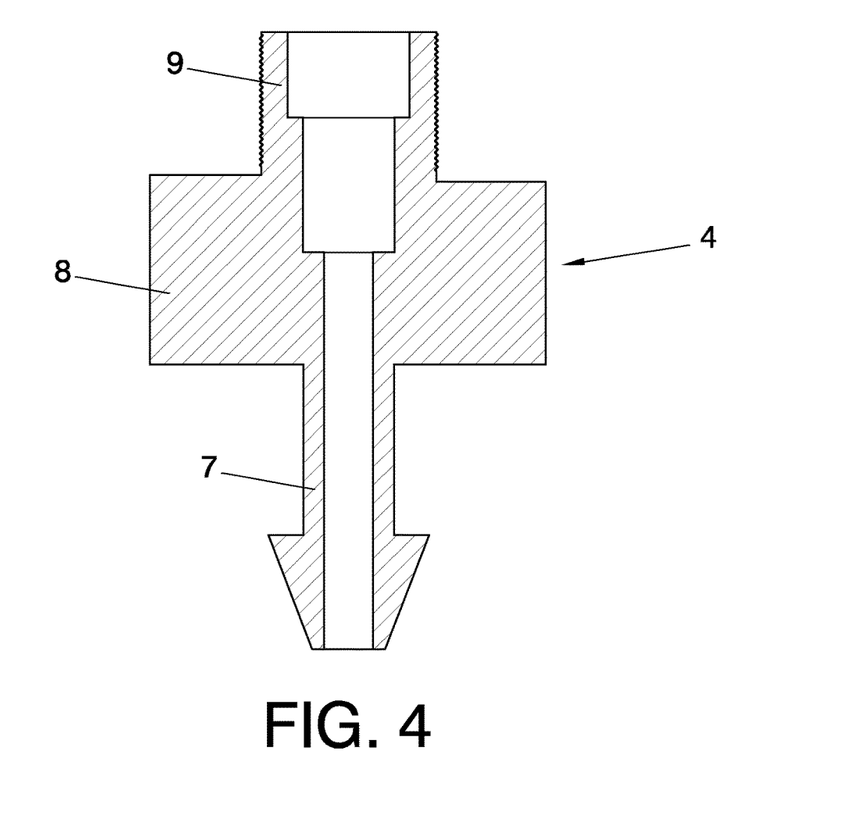
FIG. 4 shows a view of the membrane-carrier of the non-return adapter system.

FIG. 4 shows a preferred embodiment of the membrane-carrier (4) characterized in that it comprises a first area (7) especially adapted to be connected to the elastic container (2). This first area (7) can comprise a pyramidal end, preferably, of 9.50 mm in length and a second end, preferably cylindrical in shape and with a length of 14 mm. It also comprises a second area (8) adaptable to the vessel (2) neck and with a preferred length of 15.5 mm, and a third area (9), narrower than the second area (8) and perfectly connectable to the adapter system closing element (6). Preferably, the length of this third area (9) is 11 mm and has a preferred inner diameter at the upper end of 8.2 mm and an inner diameter at the bottom of 7.5 mm. In turn, the preferred inner diameter of the first area (7) is 4 mm.

Figure 5:
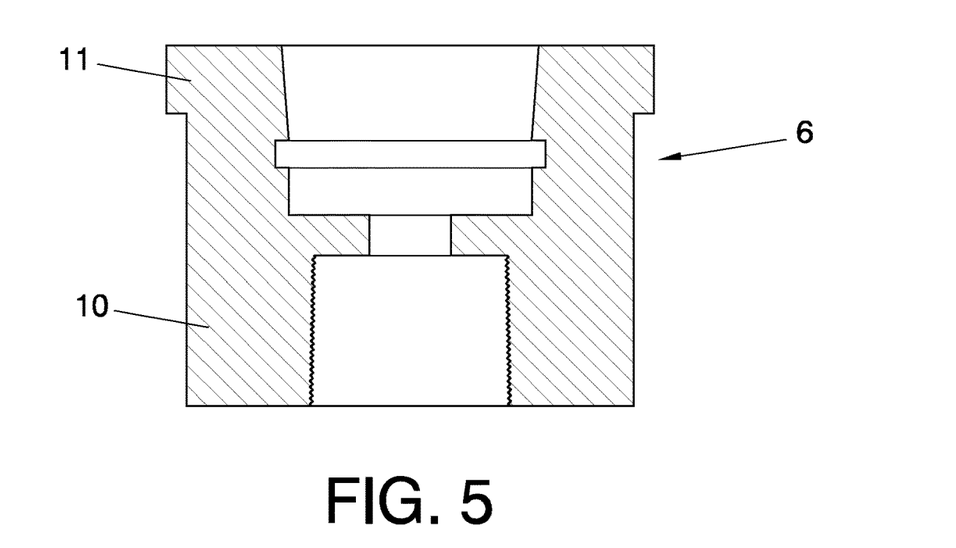
FIG. 5 shows a view of the non-return adapter system closing element.

FIG. 5 shows a preferred embodiment of the adapter system closing element (6) characterized in that it comprises a first area (10) especially adapted to be coupled to the membrane-carrier (4), which preferably has an aperture inner diameter of 14 mm, a total length of 21.50 mm and a total outer diameter, at the bottom, of 23 mm. It also comprises a second area (11) preferably of 2.5 mm in length and with a preferred 18.2 mm inner diameter at the outer part and a 26 mm outer diameter. The first area (10) can in turn comprise a narrowing in an intermediate position with a preferred 6 mm inner diameter.

Figure 6:
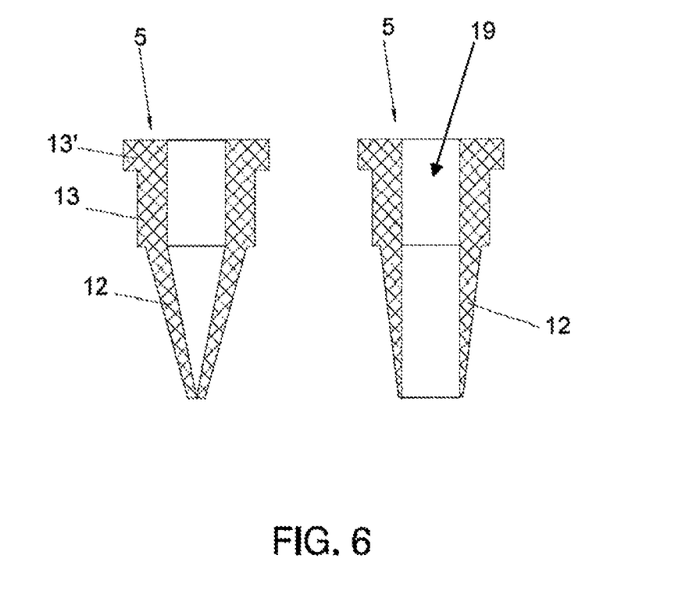
FIG. 6 shows the non-return membrane in a side position and in front position.
Figure 7:
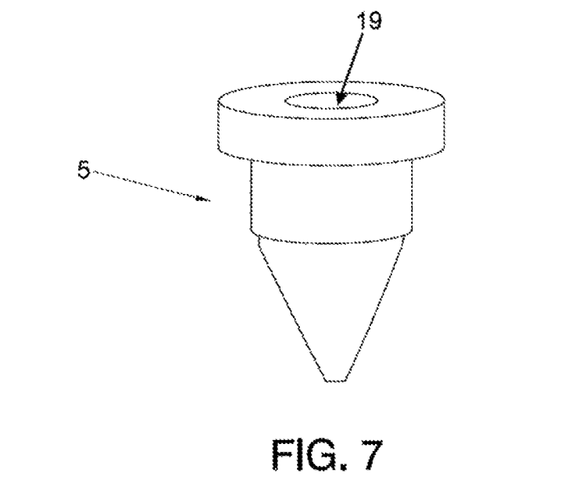
FIG. 7 shows a 3D view of the non-return membrane in a side position.
Figure 8:
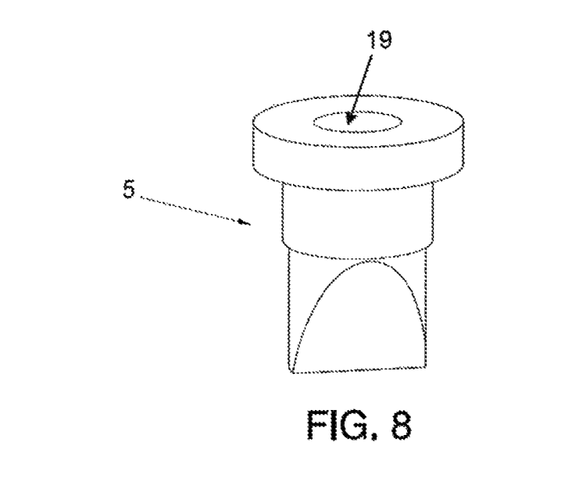
FIG. 8 shows a 3D view of the non-return membrane in a front position.

FIG. 6 shows a preferred embodiment of the non-return membrane (5). The membrane preferably has a central opening (19) therethrough extending from a superior end to an inferior end, a first zone (12), with sidewalls tilted (angled) towards the interior, a second zone (13) and a third zone (13'). Preferably, the length of the first zone (12) is 9.5 mm; the one length of the second zone (13) is 5 mm and the one length of the third zone (13') is 2.5 mm. Also, the inner diameter of the non-return valve or membrane (5), corresponding to the diameter of the central opening (19), is preferably 5 mm, and the outer diameter of the top is 12 mm.

Figure 9:
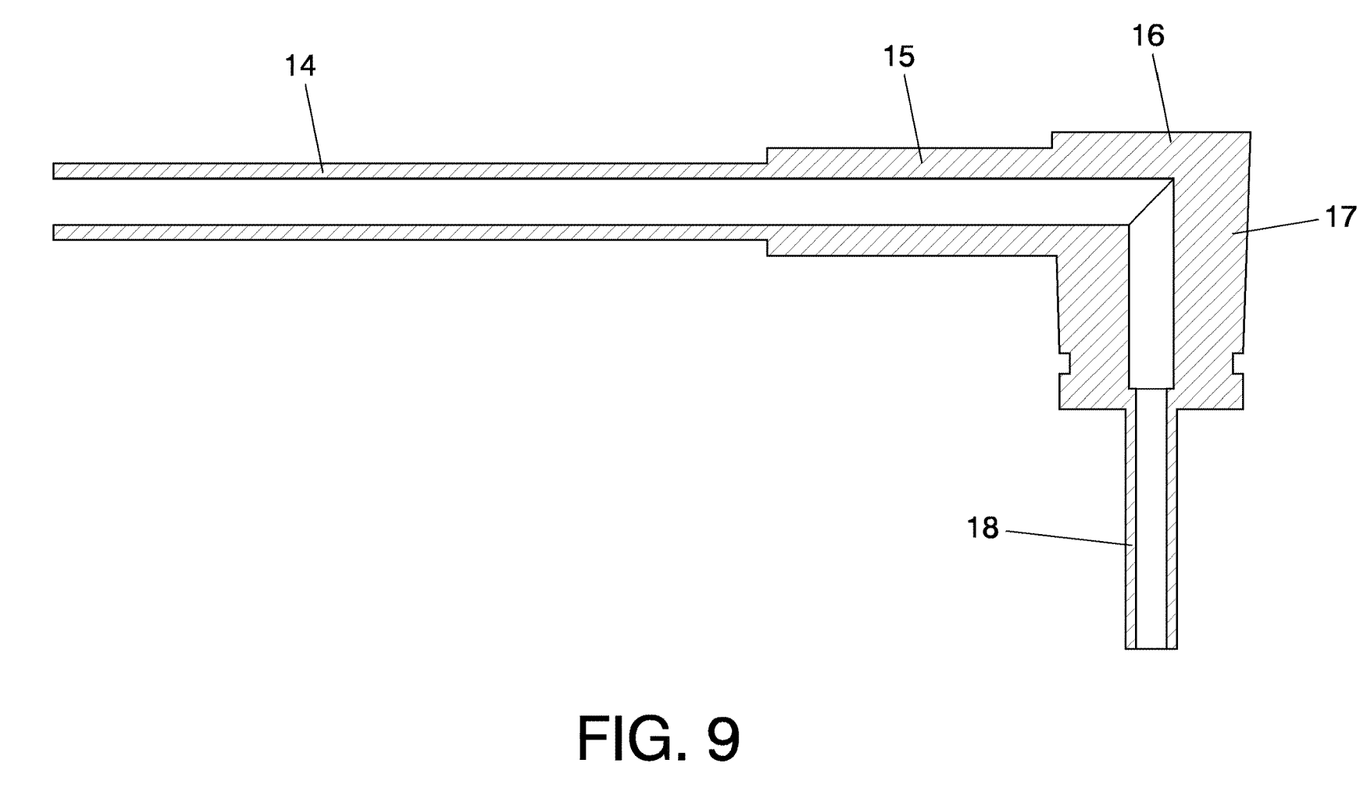
FIG. 9 shows a view of the connecting element.

Finally, FIG. 9 shows a preferred embodiment of the connecting element (3). Said connecting element is characterized in that it comprises a first end especially suited to be inserted into the tree or palmaceae trunk to be treated, preferably, tubular in shape and horizontal in orientation. Preferably, said end comprises a first area (14), preferably, with a length of 40, 80 o 140 mm, a second area (15) with a preferred length of 28 mm, and a third area (16) with a preferred length of 19.5 mm. Preferably, said first end has an inner diameter of 4.5 mm and an outer diameter of 7.5 mm. Additionally, the connecting element (3) comprises a second end designed to be connected to the vessel (1). This second end preferably comprises a first area (17) with a preferred length of 27.21 mm, an inner diameter of 4.5 mm and an outer diameter of 18 mm, and a second area (18), preferably tubular in shape, with a preferred length of 23.5 mm, an inner diameter of 3 mm and an outer diameter of 5 mm.

Example for Selecting the Hole in the Trunk

As previously mentioned, the hole(s) made in the tree or palmaceae to be treated is selected according to the perimeter of said species trunk. Different possibilities according to the species to be treated are now collected, by way of example;

| Species | Metal drill bit | Hole depth | Hole |
|---|---|---|---|
| Pine/Cork tree | Diameter: 6 mm Length: 9-11 mm | Larger than the connecting element | One every 20-25 cm |
| Palm tree | Diameter: 6 mm Length: 35-50 mm | Until it reaches the stipe center | One every 25-30 cm |
| Other species | Diameter: 6 mm Length: 5-6 mm | Larger than the connecting element | One every 15-20 cm |

In all cases, the holes were homogenously distributed around the trunk or stipe (in case of the palm trees) perimeter, at different heights between each other. In the case of palm trees, the holes were made about 1.5-2 m below the leaf crown, whereas in the case of the pine/cork tree and remaining species, the holes were made at the low area. Also, in the case of the pine/cork tree and palm trees, each hole was made with the drill slightly tilted downwards, whereas in the remaining species these were made with the drill arranged perpendicularly to the trunk surface.

Example for Applying the Device with the Mixture "In Situ"

Next, a test performed with a particular embodiment of the application device object of the invention is shown, by way of example. Namely, the test was performed in a total of 10 palmaceae of the *Phoenix canariensis* species.

To carry it out, the CONFIDOR® phytosanitary was dosed during the application using a commercially available vaccinator used in the veterinary practice.

Used Elements

Namely, the elements used in the test were the followings:
1. Injection device object of the invention which in turn consisted of the following expendable elements:
a) a vessel having inside an elastic container suited for containing the mixture to be injected, in this case, preloaded with a nutritious solution compatible with the phytosanitary to be injected;
b) a connecting element, in this case, a plastic cannula, adapted to be inserted into the hole made in the palmaceae trunk;
c) a non-return adapter system located at the vessel outlet and suited for allowing its connection to the connecting element;
2. Also, a dispenser device made up of two elements was used: a dosing device (which, in this case, was a commercially available vaccinator used in the veterinary practice) for inserting the phytosanitary dose into the device vessel, and a vessel containing the CONFIDOR® phytosanitary adapted to the dosing device.
3. Finally, the following tools were used in order to introduce the injection device into the palmaceae trunk: drill-bit and nylon hammer.

Application Method

The application method used consisted of the following steps:
1. Firstly, a hole was made in the trunk by using a conventional battery-driven drill and a drill bit of 6.5 mm in diameter and 30 cm in length;
2. Then, the connector was inserted into the hole until perfectly fitted in, either by finger pushing or tapping it with the nylon hammer;
3. Subsequently, a predetermined dose (2 ml) of the CONFIDOR® phytosanitary product was loaded.

Once the product dose was set, the dosing device nozzle was coupled at the non-return adapter system entry and with a simple "pulse" the product was introduced through the non-return membrane thus mixing it with the nutritious solution preloaded in the elastic container;
4. Then the vessel was connected to the connecting element head. The assembly was suspended until the nutritious-phytosanitary solution was completely absorbed. When this was absorbed the vessel shrinking was observed due to the reduction of the volume occupied by the elastic container therein;
5. Once the product was absorbed, the pressurized vessel and connector were removed.

SUMMARY OF THE APPLICATION

The test was performed during the absorption under meteorological conditions of 10° C. and under a cloudy cycle (low sunlight).

The parameters measured during the application were:
Application time of each unit (Steps: 1 to 4): 25-30 seconds;
Absorption time of each unit: 5-10 minutes.

CONCLUSIONS

Departing from the previous results it can be concluded that the application method of the present invention enables to considerably reduce the application times with regard to other existing endotherapy systems, and consequently lowering the costs associated with the workforce.

In the same way, this is a simple and safe application method to the applicator, what makes it available for all kinds of users, including non-professionals.

Finally, the possibility of product spillage which may affect the environment did not exist.

The invention claimed is:

1. A device for injecting at least one of a chemical substance and a preparation into trees or palmaceae, wherein the device is hermetic and comprises:
   a. a vessel having an outlet and an elastic container located inside the vessel, the elastic container contains the at least one of the chemical substance and the preparation at a low pressure, between 1 and 1.8 bars, allowing the at least one of the chemical substance and the preparation to leave the device through the outlet by pressure applied by the elasticity of the elastic container;
   b. a connecting element adapted to be introduced into the tree or palmaceae trunk by a first end; and
   c. an adapter system located at the outlet of the vessel, which comprises a non-return membrane, a membrane-carrier element, and a closing element,
   the non-return membrane connected to either the connecting element at a second end thereof for injecting the at least one of the chemical substance and the preparation into the tree or to a filling device for inserting the at least one of the chemical substance or the preparation into the elastic container,
   the non-return membrane seated within a bore of the membrane-carrier element and trapped therein by the closing element, and the closing element having an aperture therethrough in fluid communication and axial alignment with the non-return membrane so as to provide selective engageable access to the non-return membrane by either the second end of the connecting element or the filling device,
   the non-return membrane comprising a central opening extending therethrough from a superior end to an inferior end, and a first zone having sidewalls tapering towards an interior of the non-return membrane to close the opening at the inferior end, the sidewalls engage and open by insertion of either the second end of the connecting element or the filling device,
   wherein the adapter system allows single or multiple loads of the elastic container by insertion of the at least one of the chemical substance and the preparation through the non-return membrane without losses to the exterior, and the coupling to the connecting element by the second end thereof; and
   the membrane-carrier element comprises a first area connected to the elastic container, a second area connected to the vessel and a third area connected to the closing element; and comprises an open end connected to the elastic container and a second end opposite to the open end having the bore and supports the non-return membrane and coupled to the closing element of the adapter system
   the vessel is made of a flexible material, whereby the complete absorption of the chemical substance and/or preparation by the trees or palmaceae causes deformation of the vessel as the elastic container inside the vessel, under vacuum is gradually emptying.

2. The device according to claim 1, wherein the at least one of the chemical substance and the preparation is loaded into the device at the factory.

3. The device according to claim 1, wherein the device contains at least one of a chemical substance and a preparation.

4. The device according to claim 1, wherein the device contains two or more of the chemical substances and the preparations.

5. The device according to claim 1 wherein
   the connecting element is tubular and has an outlet for insertion into a plant and has an opposite inlet configured to be connected to the non-return valve so as to penetrate the non-return valve to allow flow of the liquid from the elastic container, through the bore, through the connecting element, and into a plant, and
   wherein the valve is openable either when penetrated by the tubular connecting element and is otherwise closed, and thereby the valve selectively controls the flow of liquid through the adapter system between the adapter upper and lower openings, or when penetrated by a filing device for loading the elastic container with the at least one of the chemical substance and the preparation by insertion thereof.

6. The device according to claim 1, wherein the bore of the membrane-carrier element defines a stepped configuration for receiving the non-return membrane.

7. A method for applying at least one of a chemical substance and a preparation to trees or palmaceae, the method comprising providing the device according to claim 1, and:
   making at least one hole in the tree or palmaceae trunk;
   inserting the first end of the connecting element of the device into the at least one hole; and
   coupling the second end of the connecting element to the adapter system located at the outlet of the vessel, which comprises the non-return membrane, the membrane carrier element, and the closing element of the adapter system, thus leading to the absorption of the at least one of the chemical substance and the preparation into the tree or palmaceae through their vascular system using the natural transpiration process of the tree or palmaceae in combination with the pressure of the elastic container,
   maintaining the device coupled to the tree or palmaceae trunk until the vessel is shrunk due to the reduction of the volume occupied by the elastic therein when the chemical substance or the preparation is absorbed;
   removing the device once the chemical substance or preparation is completely absorbed and the vessel is completely shrunk.

8. The method according to claim 7, wherein the holes in the palmaceae are spaced 20-25 cm apart.

9. The method according to claim 7, wherein the device is applied in an upward direction, a downward direction or sideways.

10. The method according to claim 7, wherein the at least one of the chemical substance and the preparation is a phytosanitary active substance, a fertilizer or a phytofortifier.

11. The method according to claim 7, wherein the device empties in 5-60 minutes.

12. The method according to claim 7, wherein a base substance is contained in the elastic container and the at least one of the chemical substance and the preparation is loaded in situ in the elastic container through the non-return membrane by a filling device before coupling the connecting element by the second end thereof to the adapter system located at the outlet of the vessel.

13. The method according to claim 7, wherein the hole in the palmaceae is 1.5 to 2 meters below the crown.

\* \* \* \* \*